Figure 1:
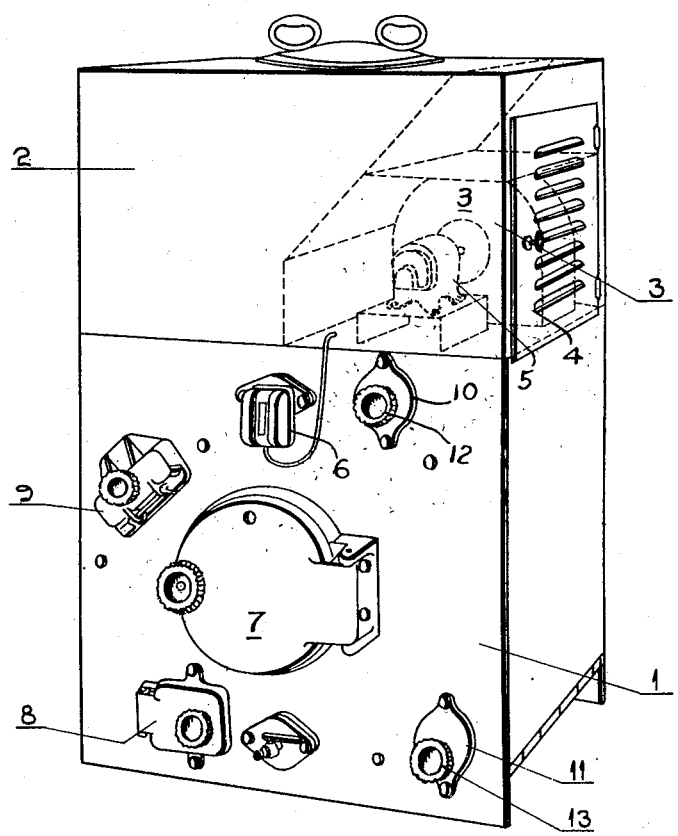

Dec. 11, 1951    A. G. EDVINSSON    2,578,051
SOLID FUEL FURNACE

Filed July 22, 1947    2 SHEETS—SHEET 1

Anders Gunnar Edvinsson,
Inventor

By Cushman, Darby + Cushman,
attys.

Dec. 11, 1951     A. G. EDVINSSON     2,578,051
SOLID FUEL FURNACE
Filed July 22, 1947     2 SHEETS—SHEET 2
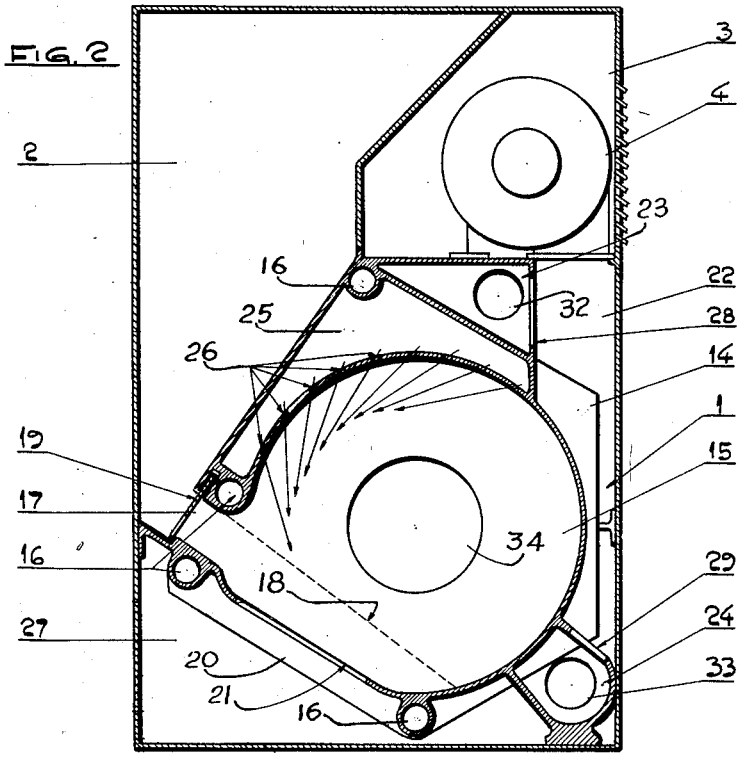
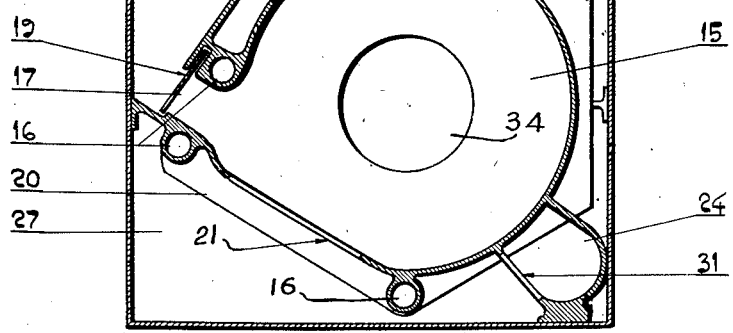

UNITED STATES PATENT OFFICE 2,578,051

SOLID FUEL FURNACE

Anders Gunnar Edvinsson, Lerum, Sweden, assignor to Aktiebolaget Gotaverken, Goteborg, Sweden, a corporation of Sweden Application July 22, 1947, Serial No. 762,612
In Sweden July 3, 1943

Section 1, Public Law 690, August 8, 1946
Patent expires July 3, 1963

3 Claims. (Cl. 110—29)

The present invention relates to an arrangement in furnaces in which solid fuel during operation of the furnace falls down on an inclined grate from an opening provided in a side wall of the substantially prismatic combustion chamber, and particularly in precombustion furnaces which are used in connection with common heating boilers originally adapted to work as boilers of the magazine type. The invention has for its object to obtain a favourable combustion of the fuel by means of a suitable shape of the combustion chamber proper and by means of a certain arrangement of the supply of combustion air.

In the annexed drawings, there is illustrated an embodiment of the invention. Fig. 1 is a perspective view of a precombustion furnace of the forced draught type according to the invention, and Figs. 2 and 3 are vertical sections through the furnace.

The precombustion furnace comprises the furnace proper 1, the fuel magazine 2 and the fan chamber 3, all of said parts being included by a prismatic case. The fan chamber 3 includes an electric motor 5 which drives a fan 4. The motor is started and stopped by means of a thermostat 6 in response to the water temperature in the furnace. At the front side of the furnace, there is provided a door 7 through which the interior of the combustion chamber is accessible, and a door 8 through which ashes etc. can be removed from the space below the grate. There are further provided a door 9 through which members can be introduced for controlling the supply of fuel to the combustion chamber, and two doors 10 and 11 through which stems provided with hand wheels 12 and 13, respectively, are connected with control members located within the air passages inside the doors. The mode of operation of the control members will be described in detail with reference to Figs. 2 and 3.

The furnace portion 1 is composed of a number of cast C-shaped sections 14 which surround the cylindrical combustion chamber 15. The sections are provided with four nipples 16 by means of which they can be interconnected so as to form a closed water circulating system. The number of the sections is dependent upon the size of the furnace. The outer contour of the sections is substantially a square one, and one of the diagonals is approximately vertical. Two nipples are disposed at the highermost and lowermost point, respectively, of the square, and the other two nipples are located on each side one of the opening 17 of the C, said opening constituting the charging opening for the fuel. In this manner, an efficient water circulation is obtained around that place which should be effectively cooled. The fuel falls down by its own weight from the magazine into the furnace through the opening 17 and, if said opening is entirely open, fills up a segmental portion of the combustion chamber, as indicated by the dotted line 18 in Fig. 2. The height of the fuel layer is controlled by means of plates 19 which have charging openings of minor height than the opening 17, said plates being adapted to be introduced through the door 9 at the front side of the furnace. If a plate having a certain charging opening is introduced, the quantity of fuel supplied can be controlled in accordance with the requirement. In order that the height of the fuel layer shall not be different in different portions of the layer, the grate surface of the combustion chamber is substantially plane and approximately parallel to the boundary line 18 of the fuel within the portion 20 which carries the fuel. Said portion 20 serves as a grate and is provided with air supply openings 21. The combustion air compressed by the fan is forced through a chamber 22 which extends along the entire furnace. From said chamber, the air is branched into two passages 23 and 24 enclosed in the sections. The passage 23 communicates with the space 25 from which secondary combustion air enters the combustion chamber through a number of inlet openings 26. The inlet openings are arranged in such a manner that the secondary air, as indicated by arrows, will flow in tangentially with respect to an imaginary cylindrical surface which is concentric with respect to the circular outlet 34 provided in the end wall of the furnace, and said cylindrical surface has a greater diameter than said outlet. As a result thereof, the combustion gases within the combustion chamber will be given a rotary movement so as to sweep over the fuel burning on the grate. The passage 24 communicates with the space 27 below the grate 20, and a certain portion of the combustion air enters the combustion chamber through said space to serve as primary combustion air.

To render possible the control of the flow of air through the two passages 23 and 24, these passages are provided with control members to be actuated by the above-named hand wheels 12 and 13. Fig. 2 shows a section immediately in front of the intermediate section which is located nearest to the end section. Here, the walls between the passages 23 and 24 and the air chamber 22 are provided with openings 28 and 29 through which air can flow into the passages. Fig. 3 shows a section in front of any intermediate section behind the first intermediate section. The walls between the passages and the air chamber are closed, whereas the walls limiting the chambers 25 and 27 are provided with openings 30 and 31 so that air can enter said chambers. Between the first and the consecutive section there is arranged a wall in each of the passages 23 and 24, said wall being provided with an opening 32 and 33, respectively. The size of these openings can be controlled by suitable members, such as disc valves to be actuated by the hand wheels 12 and 13, respectively, so as to supply an appropriate quantity of air into the respective branch passage.

The invention is not limited to the embodiment illustrated in which constructional modifications may be made within the scope of the annexed claims.

What I claim is:

1. In a furnace for solid fuel, means forming a combustion chamber of uniform cross-section having side walls and end walls, a slanting grate lying substantially in a plane in the lower portion of said combustion chamber, means for supplying primary combustion air through said grate, a fuel charging opening in one of said side walls, said chamber having a plurality of openings for supplying secondary combustion air to said chamber, said air openings being directed tangentially with respect to an imaginary cylindrical surface within said chamber, the axis of said imaginary cylindrical surface being substantially parallel to said side walls and to the plane of said grate, and an outlet opening in one of said end walls for combustion gases from said chamber.

2. In a furnace for solid fuel, means forming a combustion chamber of uniform cross-section having side walls and end walls, a slanting grate lying substantially in a plane in the lower portion of said combustion chamber, means for supplying primary combustion air through said grate, a fuel charging opening in one of said side walls, said chamber having a plurality of openings for supplying secondary combustion air to said chamber, said air openings being directed tangentially with respect to an imaginary cylindrical surface within said chamber, the axis of said imaginary cylindrical surface being substantially parallel to said side walls and to the plane of said grate, and an outlet opening in one of said end walls for combustion gases from said chamber, said outlet opening being substantially circular and having a diameter smaller than said imaginary cylindrical surface.

3. In a furnace for solid fuel, means forming a combustion chamber of uniform cross-section having side walls and end walls, a slanting grate lying substantially in a plane in the lower portion of said combustion chamber, means for supplying primary combustion air through said grate, a fuel charging opening in one of said side walls, said chamber having a plurality of openings for supplying secondary combustion air to said chamber, said air openings being directed tangentially with respect to an imaginary cylindrical surface within said chamber, the axis of said imaginary cylindrical surface being substantially parallel to said side walls and to the plane of said grate, and an outlet opening in one of said end walls for combustion gases from said chamber, said outlet opening being located substantially concentrically with respect to said imaginary cylindrical surface.

ANDERS GUNNAR EDVINSSON.

REFERENCES CITED

The following references are of record in the file of this patent:

UNITED STATES PATENTS

| Number | Name | Date |
| --- | --- | --- |
| 1,618,808 | Burg | Feb. 22, 1927 |
| 1,795,347 | Reese | Mar. 10, 1931 |

FOREIGN PATENTS

| Number | Country | Date |
| --- | --- | --- |
| 3,749 | Australia | Mar. 26, 1901 |
| 630,857 | Germany | June 8, 1936 |
| 108,040 | Sweden | May 27, 1943 |